Figure 1:
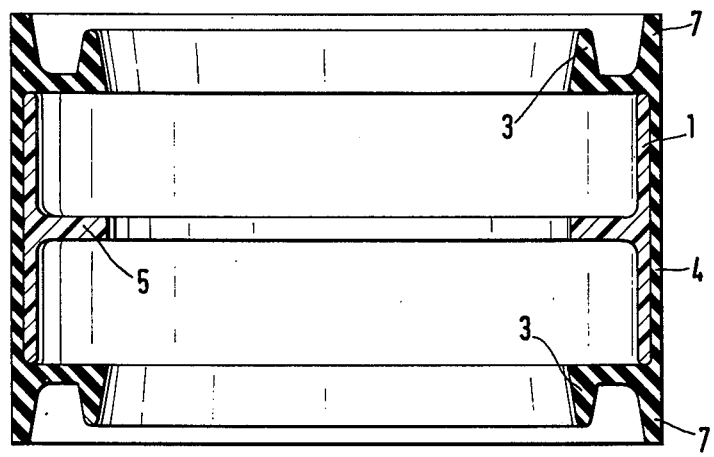

United States Patent [19]

Wolf

[11] 4,116,474
[45] Sep. 26, 1978

[54] PIPE COUPLING

[76] Inventor: Franz-Josef Wolf, D-6483 Bad Soden-Salmunster, Sprudelallee 19, Germany

[21] Appl. No.: 851,591

[22] Filed: Nov. 14, 1977

Related U.S. Application Data

[63] Continuation-in-part of Ser. No. 675,457, Apr. 9, 1976, abandoned.

[51] Int. Cl.² ............................................. F16L 49/00
[52] U.S. Cl. .................................... 285/110; 285/230; 285/235
[58] Field of Search ................. 285/110, 235, 236, 230

[56] References Cited

U.S. PATENT DOCUMENTS

| 1,926,197 | 9/1933 | Durr | 285/110 |
|---|---|---|---|
| 2,726,103 | 12/1955 | Slattery | 285/235 X |
| 3,334,928 | 8/1967 | Schmunk | 285/230 X |
| 3,430,989 | 3/1969 | Wendt | 285/235 X |
| 3,453,006 | 7/1969 | Levake | 285/235 X |

FOREIGN PATENT DOCUMENTS

| 603,620 | 4/1960 | Italy | 285/110 |
|---|---|---|---|
| 1,366,139 | 9/1974 | United Kingdom | 285/235 |
| 1,365,482 | 9/1974 | United Kingdom | 285/110 |
| 1,060,504 | 3/1967 | United Kingdom | 285/235 |

Primary Examiner—Thomas F. Callaghan
Attorney, Agent, or Firm—Webb, Burden, Robinson & Webb

[57] ABSTRACT

A pipe coupling comprises a flexible insertion socket for inserting thereinto the pipe ends of pipes, particularly those made of mineral materials, that are to be connected together. The insertion socket is in the form of a cylindrical body open at both ends. It has an outside diameter larger than the diameter of either pipe end to be connected by the coupling. There is a packing ring in the form of a resilient, extensible cylindrical member having a central portion and two end portions, the central portion extending over the outer wall of the cylindrical body and the end portions projecting beyond the open ends of the cylindrical body. The packing ring forms an outer casing for the insertion socket. During and after the pipe end is inserted into the coupling, the sealing rings on the end portions of the member forming the packing ring are forced away from their normal position and disposed between the insertion socket and a pipe end to form an inherently stable structural unit with the insertion socket like a sandwich. The insertion socket may be clamped between two sealing rings. An annular rib may also be provided along the inner periphery of the insertion socket between the open ends to serve as a pipe stop. The end portions of the packing ring may also include sealing lips extending in the direction opposite the direction of insertion of the pipe ends, such that when the pipe ends are inserted into the coupling, the sealing lips engage the outer wall of the pipe ends.

7 Claims, 4 Drawing Figures

PIPE COUPLING

RELATED APPLICATION

This application is a continuation-in-part of application Ser. No. 675,457, filed Apr. 9, 1976 and now abandoned.

This invention relates to a pipe coupling which comprises a flexible socket for inserting thereinto pipe ends which are to be connected with one another, the said pipe ends being, more particularly, the extremities of pipes made of mineral materials, and which also include sealing rings associated with the ends of the sockets for the purpose of sealing off the inserted pipe ends.

It is known that pipes made of mineral materials, such as stoneware, concrete, or the like, can be manufactured only with relatively large tolerances in the inside and outside diameters and with unavoidable out-of-round configurations. Such pipes are regularly connected with bell-shaped sleeves molded thereon and with sealing rings disposed therein. It is, however, also a known practice to seal off pipes having no couplings, by means of a costly clamp connection. Due to the above mentioned out-of-round configuration of the pipes that are to be connected to one another, the manufacture of pipe couplings with a perfect seal always entails considerable difficulties. In general, the previously known pipe couplings require a relatively large expenditure for materials and installation due to their relatively complicated construction. The invention is intended to remedy this.

It is the object of the invention to create a pipe coupling which is distinguished, on the one hand, by superior physical properties and adaptability, and on the other hand, by a particularly simple construction and functionally satisfactory assembly.

The invention achieves this object in a pipe coupling of this type by connecting the sealing rings with one another to form a packing ring, and this packing ring forms an inherently stable resilient structural unit with the insertion socket. As the result of these inventive measures the packing ring in combination with the sealing rings forms a genuine bond with the insertion socket which is highly stable insofar as strength is concerned, sufficient flexibility being preserved to assure a perfect fit of the insertion socket and consequently the sealing rings on the frequently extreme out-of-round configuration of the pipes or pipe ends that are to be connected to one another. During the insertion of the pipe ends that are to be sealed off it is impossible for the sealing rings to become dislodged or to be subjected to deformation that is functionally unsatisfactory. Supplementary connecting members, such as clamping collars, clamps, or adhesive pipe covers can be eliminated. Indeed, by simply inserting into the insertion socket the pipe ends that are to be joined, a pipe coupling can be obtained that is slide-proof and heavy-load-proof, a pipe coupling in which the pipe ends can be angled to a predetermined degree and still effectively seal off the internal and external water pressure as required by construction regulations.

The insertion socket may be made of a synthetic material, such as plastic, that has a tendency toward flexural resiliency, of hard rubber that has a tendency toward softness, or soft rubber that has a tendency toward hardness. The packing ring and the sealing rings may also be made of rubber and are preferably adhesively joined to the insertion socket, and more particularly, they may be vulcanized thereon.

According to the invention, the packing ring is designed as the outer casing for the insertion socket, a casing which is positively and frictionally connected with the insertion socket. According to one embodiment of the invention, the insertion socket may be clamped between the two sealing rings, e.g. it may be snapped in or sprayed in.

Moreover, the insertion socket may be provided with an annular rib on the inner periphery of the socket to serve as a stop for a pipe end. This annular rib facilitates assembly during the insertion of the pipe ends that are to be joined.

A plurality of sealing rings may be disposed consecutively in both halves of the socket, e.g. in the form of lip seals, and thus the overall sealing effect is enhanced. This also applies to a special embodiment of the invention according to which the ends of the packing rings project in the direction of insertion beyond the ends of the socket and the sealing rings, and therefore abut against the pipe ends which are inserted into the insertion socket.

The basic advantages of the invention are that a pipe coupling is created wherein in combination with a packing ring which supports the sealing rings and forms a structural unit therewith, the insertion socket is distinguished by extremely high physical stability on the one hand, and on the other hand, by special adaptability to the regularly occurring out-of-round configurations of pipe ends that are made of stoneware, concrete, or similar mineral materials. Moreover, the pipe coupling is particularly simple and constructed in a functionally satisfactory manner; in other words, in a particularly simple manner of assembly it guarantees a satisfactory connection by the mere insertion of the pipe ends that are to be connected with one another without the need for the usual supplementary connecting members. A perfect seal against internal and external water pressure is always assured, even when the pipe ends or pipes are angled.

Figure 2:
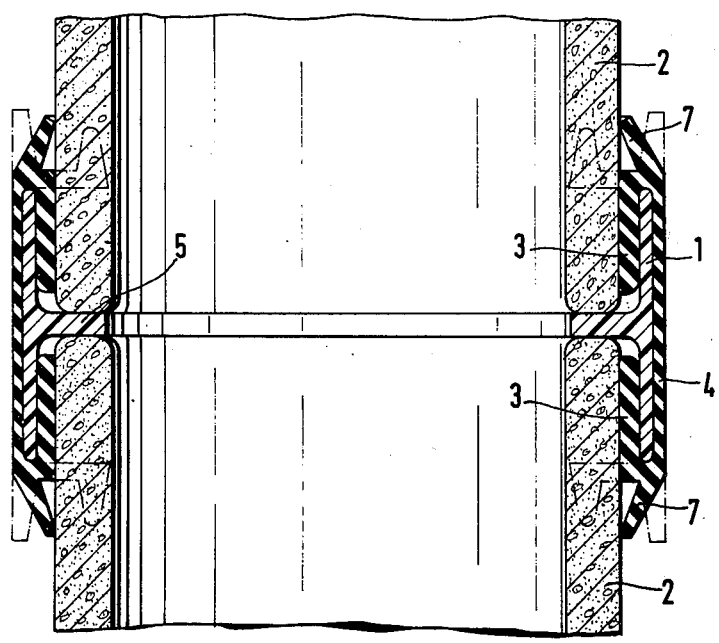
Figure 3:
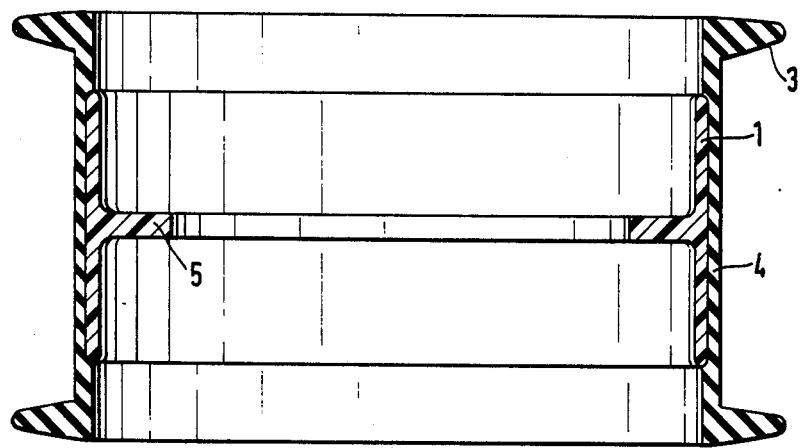
Figure 4:
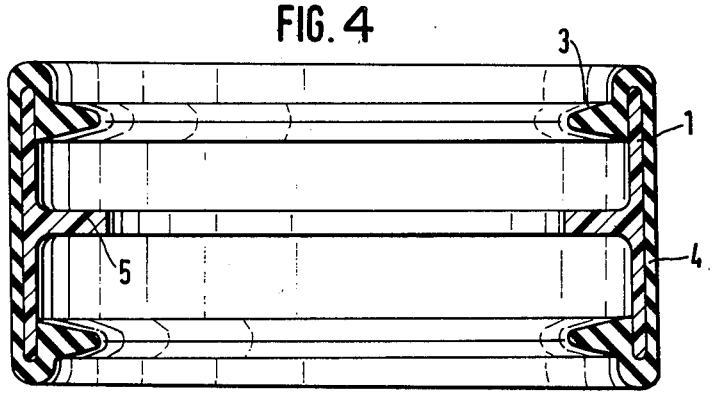

Hereinafter, the invention will be more fully described in connection with the accompanying drawings in which:

FIGS. 1 and 2 are cross-sectional views of one embodiment of the pipe coupling, without and with pipe ends inserted in the socket, respectively; and FIGS. 3 and 4 are cross-sectional views of a second embodiment of the pipe coupling, with and without pipe ends inserted in the socket, respectively.

The drawings show in FIGS. 1 and 2 a pipe coupling comprising a flexible insertion socket 1 in the form of a cylindrical body open at both ends for inserting thereinto pipe ends 2 which are to be connected with one another, the pipe ends being the extremities particularly of pipes made of mineral materials, and also including sealing rings 3 associated with the ends of the socket for sealing off the inserted pipe ends 2. The sealing rings 3 are formed on the end portions of the packing ring 4, which includes a central portion which extends over the body and forms an inherently stable resilient structural unit with the insertion socket in the manner of a sandwich. Insertion socket 1 may be made of synthetic material, such as plastic, that tends toward flexural resiliency, hard rubber that has a tendency toward softness, or soft rubber that has a tendency toward hardness.

Packing ring 4 and sealing rings 3 are preferably made of soft rubber and are adhesively joined to insertion socket 1, more particularly, they may be vulcanized thereon. Packing ring 4 is formed as the outer casing for the insertion socket 1, being positively and frictionally joined to the socket. In the embodiment of FIGS. 1 and 2, insertion socket 1 is clamped between the two sealing rings 3, for example, it is sprayed or snapped thereinto.

Insertion socket 1 may be equipped with an annular rib 5 that runs around the inner periphery of the socket and serves as a stop for the pipe ends.

In the embodiment of FIGS. 1 and 2, there are sealing lips 7 on extremities of the packing ring 4 which project in the direction of insertion beyond the ends of the socket 1 and the sealing rings 3. Consequently, when the pipe ends 2 are inserted into the socket, the sealing lips 7 abut against the pipe ends as supplemental sealing rings.

The embodiment of the invention shown in FIGS. 3 and 4 includes insertion socket 1 in the form of a cylindrical body having open ends. An outer casing of a flexible, extensible member in the form of a packing ring 4 extends around the insertion socket, the central portion of the packing ring being positively and frictionally constricted over the insertion socket. The end portions of the packing ring extend beyond the open ends of the cylindrical body and terminate in sealing rings 3. In FIG. 3 the sealing rings are shown in their tension-free or relaxed state extending transversely of the packing ring in a direction away from the axis through the coupling and are not in contact with the inner wall of the socket. In FIG. 4 the same sealing rings are shown in a second tension-free or relaxed state extending inwardly toward said axis and around the end of the cylindrical body forming the insertion socket 1. This position shown in FIG. 4 is achieved easily by turning sealing ring 3 axially into the body forming insertion socket 1 to such an extent that the rest of the ring will flop into position. When the pipe ends are forced into the coupling, the sealing rings flex until they are disposed between the inner wall of the body and the outer walls of the pipe ends forming a seal therebetween.

Having described preferred embodiments of the invention, it should be understood that it may be otherwise embodied within the scope of the appended claims.

I claim:

1. In a pipe coupling for connecting to one another the ends of two pipes made of mineral materials which includes an insertion socket in the form of a cylindrical body open at both ends and having an outside diameter larger than the diameter of either pipe and a packing ring in the form of a resilient, extensible cylindrical member having a central portion and two end portions, the central portion extending over the outer wall of said body and the end portions projecting beyond the open ends of the cylindrical body, at least one sealing ring on each of the end portions of the member forming the packing ring, the improvement comprising the packing ring being formed as the outer casing for the insertion socket, and the sealing rings on the end portions extending radially of the central portion beyond the ends of the insertion socket and having no contact with the inner wall of said body prior to insertion of a pipe end into the coupling and being disposed between the insertion socket in contact with said inner wall and the outer wall of the pipe during and after insertion.

2. The improvement according to claim 1 wherein the insertion socket is made of one of a synthetic material having a tendency toward flexural resiliency, hard rubber having a tendency toward softness, and soft rubber having a tendency toward hardness.

3. The improvement according to claim 1 wherein the packing ring and the sealing rings are made of soft rubber and are adhesively joined to the insertion socket.

4. The improvement according to claim 3 wherein the sealing rings are vulcanized on the insertion socket.

5. The improvement according to claim 1 wherein the insertion socket is clamped between two sealing rings.

6. The improvement according to claim 1 wherein the insertion socket is provided with an annular rib that runs along the inner periphery of the socket to serve as a pipe stop.

7. The improvement according to claim 1 wherein the extremities of the packing ring form sealing lips which project beyond the ends of the socket and sealing rings in the direction of insertion and, consequently, when the pipe ends are inserted into insertion socket, abut against the said pipe ends.

* * * * *